(12) United States Patent
Arai et al.

(10) Patent No.: US 8,211,817 B2
(45) Date of Patent: Jul. 3, 2012

(54) FUSED SILICA GLASS AND PROCESS FOR PRODUCING THE SAME

(75) Inventors: Kazuyoshi Arai, Yokohama (JP);
Tsutomu Takahata, Yokohama (JP);
Shinkichi Hasimoto, Sagamihara (JP);
Masahito Uchida, Yokohama (JP);
Nobusuke Yamada, Sagamihara (JP);
Yoshinori Harada, Sagamihara (JP);
Hideharu Horikoshi, Shunan (JP)

(73) Assignees: Tosoh Corporation, Yamaguchi (JP);
Tosoh SGM Corporation, Yamaguchi (JP)

(*) Notice: Subject to any disclaimer, the term of this patent is extended or adjusted under 35 U.S.C. 154(b) by 253 days.

(21) Appl. No.: 12/440,683

(22) PCT Filed: Sep. 11, 2007

(86) PCT No.: PCT/JP2007/067639
§ 371 (c)(1),
(2), (4) Date: May 12, 2009

(87) PCT Pub. No.: WO2008/032698
PCT Pub. Date: Mar. 20, 2008

(65) Prior Publication Data
US 2010/0041538 A1    Feb. 18, 2010

(30) Foreign Application Priority Data
Sep. 11, 2006 (JP) ................. 2006-245137
Jan. 29, 2007 (JP) ................. 2007-017901

(51) Int. Cl.
*C03C 3/06* (2006.01)
*C03C 10/16* (2006.01)
*C03B 27/012* (2006.01)
*C03B 19/01* (2006.01)
*C03B 19/00* (2006.01)

(52) U.S. Cl. ............. 501/54; 65/33.1; 65/33.3; 65/17.3; 65/17.6

(58) Field of Classification Search .............. 501/53, 501/54, 56, 57; 65/30.1, 33.1, 33.3, 32.5, 65/33.9, 17.3, 17.6
See application file for complete search history.

(56) References Cited

U.S. PATENT DOCUMENTS
4,871,695 A * 10/1989 Seki et al. .............. 501/54
(Continued)

FOREIGN PATENT DOCUMENTS
CA        2123019        12/1994
(Continued)

OTHER PUBLICATIONS
*Glass Handbook*, edited by Takehana, Sakaino and Takahashi, Asakura Publishing Co., Ltd., Chapter 1.1.5 "Fusing aid (oxidizing agent, flux, and clarifier," pp. 296-297 (First edition published Sep. 30, 1975), and a verified English translation thereof.
(Continued)

*Primary Examiner* — Jerry Lorengo
*Assistant Examiner* — Noah Wiese
(74) *Attorney, Agent, or Firm* — Greenblum & Bernstein, P.L.C.

(57) ABSTRACT

Fused silica glass having an internal transmittance of UV with 245 nm wavelength, being at least 95% at 10 mm thickness, a OH content of not larger than 5 ppm, and a content of Li, Na, K, Mg, Ca and Cu each being smaller than 0.1 ppm. Preferably the glass has a viscosity coefficient at 1215° C. of at least $10^{11.5}$ Pa·s; and a Cu ion diffusion coefficient of not larger than $1 \times 10^{-10}$ cm$^2$/sec in a depth range of greater than 20 μm up to 100 μm, from the surface, when leaving to stand at 1050° C. in air for 24 hours. The glass is made by cristobalitizing powdery silica raw material; then, fusing the cristobalitized silica material in a non-reducing atmosphere. The glass exhibits a high transmittance of ultraviolet, visible and infrared rays, has high purity and heat resistance, and exhibits a reduced diffusion rate of metal impurities, therefore, it is suitable for various optical goods, semiconductor-production apparatus members, and liquid crystal display production apparatus members.

8 Claims, 3 Drawing Sheets

······ Example 1
—— Example 3
---- Comparative Example 2
-·-· Comparative Example 3
—— Comparative Example 6

U.S. PATENT DOCUMENTS

| | | | |
|---|---|---|---|
| 5,145,510 | A | 9/1992 | Saito et al. |
| 5,256,855 | A | 10/1993 | Heanley et al. |
| 5,376,767 | A | 12/1994 | Heanley et al. |
| 5,631,522 | A | 5/1997 | Scott et al. |
| 5,665,133 | A * | 9/1997 | Orii et al. ............. 65/17.6 |
| 6,136,736 | A | 10/2000 | Rajaram et al. |
| 6,235,669 | B1 | 5/2001 | Antczak et al. |
| 6,499,317 | B1 * | 12/2002 | Ikuta et al. ............. 65/378 |
| 2003/0041623 | A1 * | 3/2003 | Werdecker et al. ........ 65/17.6 |
| 2003/0195107 | A1 | 10/2003 | Ikuta et al. |

FOREIGN PATENT DOCUMENTS

| | | |
|---|---|---|
| EP | 0 711 736 | 5/1996 |
| EP | 1 043 282 | 10/2000 |
| EP | 1 067 097 | 1/2001 |
| JP | 3-83833 | 4/1991 |
| JP | 03-109223 | 5/1991 |
| JP | 04-238808 | 8/1992 |
| JP | 04-325425 | 11/1992 |
| JP | 5-4827 | 1/1993 |
| JP | 6-24993 | 4/1994 |
| JP | 7-81971 | 3/1995 |
| JP | 8-119664 | 5/1996 |
| JP | 2001-019450 | 1/2001 |
| JP | 2003-183034 | 7/2003 |
| JP | 2003-201124 | 7/2003 |
| JP | 2003-201125 | 7/2003 |
| JP | 2005-067913 | 3/2005 |
| JP | 2006-008452 | 1/2006 |

OTHER PUBLICATIONS

Chinese Office Action dated Apr. 13, 2011 for Chinese counterpart application CN2007 8033716, filed Sep. 11, 2007.

Japanese Office Action dated Dec. 20, 2011 for patent family member Japanese Patent Application No. 2007-235031 and English translation of the Japanese Office Action.

China Office action that issued with respect to patent family member Chinese Patent Application No. 200780033716.X, dated Mar. 28, 2012 along with an english translation thereof.

* cited by examiner

T: Thickness of general furnace tubes; approximately 5mm

FUSED SILICA GLASS AND PROCESS FOR PRODUCING THE SAME

TECHNICAL FIELD

This invention relates to fused silica glass exhibiting a high transmittance of ultraviolet ray, visible ray and infrared ray, having a high purity and a high heat resistance, and exhibiting a reduced diffusion rate of metal impurities such as copper; and a process for producing the same.

The silica glass according to the present invention can be used as, for example, various optical goods, a semiconductor-producing member, a liquid crystal-producing member, a MEMS (Micro Electro Mechanical System)-producing member, and a glass substrate for liquid crystal display. The silica glass is especially suitable for use as a furnace tube used in a semiconductor-heat treating step or a CVD production process.

BACKGROUND ART

For use as, for example, various optical goods, a semiconductor-producing member, a liquid crystal-producing member, a MEMS-producing member, and a glass substrate for liquid crystal display, silica glass exhibiting a high transmittance of ultraviolet ray, visible ray and infrared ray, and having a high purity and a high heat resistance is desired.

Further, a viewport made of silica glass is widely used for detection of the end point of etching in the production process of a semiconductor, a liquid crystal display or a MEMS. The silica glass is required to have a high transmittance of rays over a broad wavelength range spanning from ultraviolet ray through visible ray to infrared ray, and to be produced at a low cost.

In recent years, a problem arises at a step of heat-treating a semiconductor such that the semiconductor is contaminated with copper. This is because copper generated by a heater outside a heat-treating silica tube (i.e., furnace tube) diffuses through the wall of furnace tube and thus a silicon wafer placed in the furnace tube is contaminated with copper.

In general, silica glass is classified into two types, namely, fused silica glass and synthetic silica glass.

Fused silica glass is produced by fusing a powdery silica raw material by, for example, an oxyhydrogen flame, a plasma arc or a vacuum electric furnace. Fused silica glass can be produced at a low cost as compared with synthetic silica glass, mentioned below. Among the fused silica glass, fused silica glass made by fusing a natural silica material by a fusion method which does not increase the amount of OH group, such as a method using plasma arc or vacuum electric furnace, has enhanced high-temperature viscosity and heat resistance, and hence, is widely used at the step of heat-treating a semiconductor, or in the CVD production process.

However, the conventional fused silica glass made from a natural silica material undesirably contains avoidance elements for the production of a semiconductor, such as, for example, Li, K, Na and Ca in an amount of approximately 0.1 to 0.5 ppm. Therefore, the conventional fused silica glass cannot be used in a field where a high purity is required, for example, at a step of annealing a silicon wafer at a high-temperature. Further, the conventional fused silica glass exhibits an absorption band for ultraviolet rays with a wavelength of 200 nm to 240 nm, and hence, it cannot advantageously be used as optical goods for ultraviolet rays, such as for example a viewport for end point detection. Further the conventional fused silica glass has another problem such that the diffusion rate of copper and other metal impurities is very high.

Therefore, a method of using an amorphous high-purity synthetic silica powder as a silica raw material has been proposed to provide a silica glass suitable for use in a field for which high-purity is required (see, for example, Japanese Unexamined Patent Publication [hereinafter abbreviated to "JP-A"] H7-81971, especially page 3; and JP-A 2006-8452, especially page 1). However, an amorphous high-purity synthetic silica powder is usually prepared by a wet process such as a sol-gel method, and therefore, a silica glass made from the amorphous high-purity synthetic silica powder contains a residual OH group in an amount of approximately several tens ppm. The residual OH group in the silica glass tends to cause problems such that light absorption occurs in the infrared region, the high-temperature viscosity is reduced, and diffusion of copper and other metal impurities is enhanced.

To solve the above-mentioned problems, proposals have been made wherein an amorphous synthetic silica powder as a silica raw material is crystallized in advance to reduce the amount of a residual OH group, and then is fused (see, for example, JP-A H8-119664, especially page 2; and JP-A H4-238808, especially page 2). However, the proposal described in JP-A H8-119664 still has problems in that the metal impurities cannot be reduced to the desired extent, therefore, a further reduction of residual impurities is desired. Moreover, the fusion for vitrification is carried out under a strong reducing atmosphere, therefore, absorption peaks tend to occur in the vicinity of 245 nm attributed to the defect of oxygen deficiency. JP-A H4-238808 is silent on the atmosphere in which the vitrification is carried out, and further completely silent on characteristics of the resulting silica glass.

In contrast, synthetic silica glass is produced by high-temperature hydrolysis of a volatile silica raw material such as highly purified silicon tetrachloride, using, for example, an oxyhydrogen flame, and the synthetic silica glass is characterized as having very high purity. However, it is known that synthetic silica glass generally has a low viscosity coefficient at a high temperature.

As a process for producing synthetic silica glass suitable for use as a heat-resistant material, there have been proposed a process wherein a volatile silica raw material is hydrolyzed under heating to form a deposit of fine powdery silica particles simultaneously with deposition of aluminum from a volatile aluminum raw material to thereby form a soot of porous silica glass containing aluminum, and then the soot is sintered by under heating to give a transparent silica glass (see, for example, JP-A H3-83833; especially claims); and a process wherein a soot of porous silica glass formed by hydrolysis of a glass-forming material is heat-treated in a reducing atmosphere to thereby reduce a content of residual OH group, and then, the heat-treated soot is sintered by under heating to give a transparent silica glass (see, for example, JP-A H3-109223, especially page 1). However, these production processes are complicated and the synthetic silica glass is very expensive.

Further, the process described in JP-A H3-83833 does not have a step of reducing the residual OH group, and therefore, the synthetic silica glass made by this process tends to exhibit optical absorption in the infrared ray region, reduce the high-temperature viscosity, and undesirably enhance the diffusion of copper and other metal impurities.

In the synthetic silica glass having a reduced content of residual OH group, made by the process described in JP-A H3-109223, a defect of oxygen deficiency tends to occur, and thus, absorption peaks occur in the vicinity of 245 nm.

DISCLOSURE OF THE INVENTION

Problems to Be Solved by the Invention

A primary object of the present invention is to solve the above-mentioned problems and to provide a silica glass exhibiting a high transmittance of ultraviolet ray, visible ray and infrared ray, having a high purity and a high heat resistance, and exhibiting a reduced diffusion rate of copper ion and other metal impurities, which can be produced at a low cost, and is suitable for various optical goods utilizing ultraviolet ray, visible ray or infrared ray, and for a semiconductor-producing member, a liquid crystal display-producing member, a MEMS-producing member, and a glass substrate for a liquid crystal display.

The present inventors made extensive researches to achieve the above-mentioned object, and have found that the object can be attained by fused silica glass having an internal transmittance of ultraviolet ray with a wavelength of 245 nm being at least 95%, preferably at least 98% as measured at a thickness of 10 mm, a OH group content of not larger than 5 ppm, and a content of each of Li, Na, K, Mg, Ca and Cu being smaller than 0.1 ppm, preferably not larger than 0.05 ppm.

The fused silica glass preferably has a viscosity coefficient at 1215° C. of at least $10^{11.5}$ Pa·s. By incorporation of not larger than 3 ppm by weight of aluminum ingredient as aluminum metal, the fused silica glass is capable of having a viscosity coefficient at 1215° C. of at least $10^{12.0}$ Pa·s, and further capable of having a diffusion coefficient of Cu ion of not larger than $1 \times 10^{-10}$ cm$^2$/sec as measured at a depth of greater than 20 μm but not greater than 100 μm, from the surface, when the fused silica glass is left to stand at 1050° C. in the air for 24 hours.

Further, it has been found that the above-mentioned fused silica can be industrially advantageously produced by a process wherein a powdery silica raw material is cristobalitized in advance; and then, the thus-cristobalitized silica material is fused in a non-reducing atmosphere, preferably by a plasma arc fusion method.

Based on the above-mentioned findings, the present invention has been completed.

Means for Solving the Problems

In one aspect of the present invention, there is provided a fused silica glass characterized by having an internal transmittance of ultraviolet ray with a wavelength of 245 nm being at least 95%, preferably at least 98%, as measured at a thickness of 10 mm; a OH group content of not larger than 5 ppm; and a content of each of Li, Na, K, Mg, Ca and Cu being smaller than 0.1 ppm, preferably not larger than 0.05 ppm.

Further provided is a fused silica glass having the above-mentioned characteristics and further having a viscosity coefficient at 1215° C. of at least $10^{11.5}$ Pa·s, and more preferably a fused silica glass having the above-mentioned characteristics and containing not larger than 3 ppm by weight of aluminum ingredient as aluminum metal, and having a viscosity coefficient at 1215° C. of at least $10^{12.0}$ Pa·s.

Further provided is a fused silica glass having the above-mentioned characteristics and further having a diffusion coefficient of Cu ion of not larger than $1 \times 10^{-10}$ cm$^2$/sec as measured at a depth of greater than 20 μm but not greater than 100 μm, from the surface, when the fused silica glass is left to stand at 1050° C. in the air for 24 hours.

In another aspect of the present invention, there is provided a process for producing the above-mentioned fused silica glass, characterized by comprising the steps of cristobalitizing a powdery silica raw material; and then, fusing the thus-cristobalitized silica material in a non-reducing atmosphere.

Effect of the Invention

The fused silica glass of the present invention does not exhibit or exhibits only to a minimized extent a specific absorption in the wavelength region spanning from ultraviolet ray, through visible ray to infrared ray. Therefore, the fused silica glass is suitable for various optical goods for which a high transparency is required, especially useful for viewports, for example, for detecting the end point of etching. Further, the fused silica glass of the present invention has a high purity and a good high-temperature viscosity and exhibiting a reduced diffusion rate of copper ion and other metal impurities. Therefore, the fused silica glass is suitable for a member of a semiconductor-production apparatus, such as furnace material and jig, which are used for heat-treating or producing a semiconductor; a jig for a MEMS production apparatus; a lens and a lamp for ultraviolet ray; and a glass substrate for liquid crystal display.

The fused silica glass having the above-mentioned characteristics can be industrially advantageously produced by the process according to the present invention.

BEST MODE FOR CARRYING OUT THE INVENTION

Figure 1:
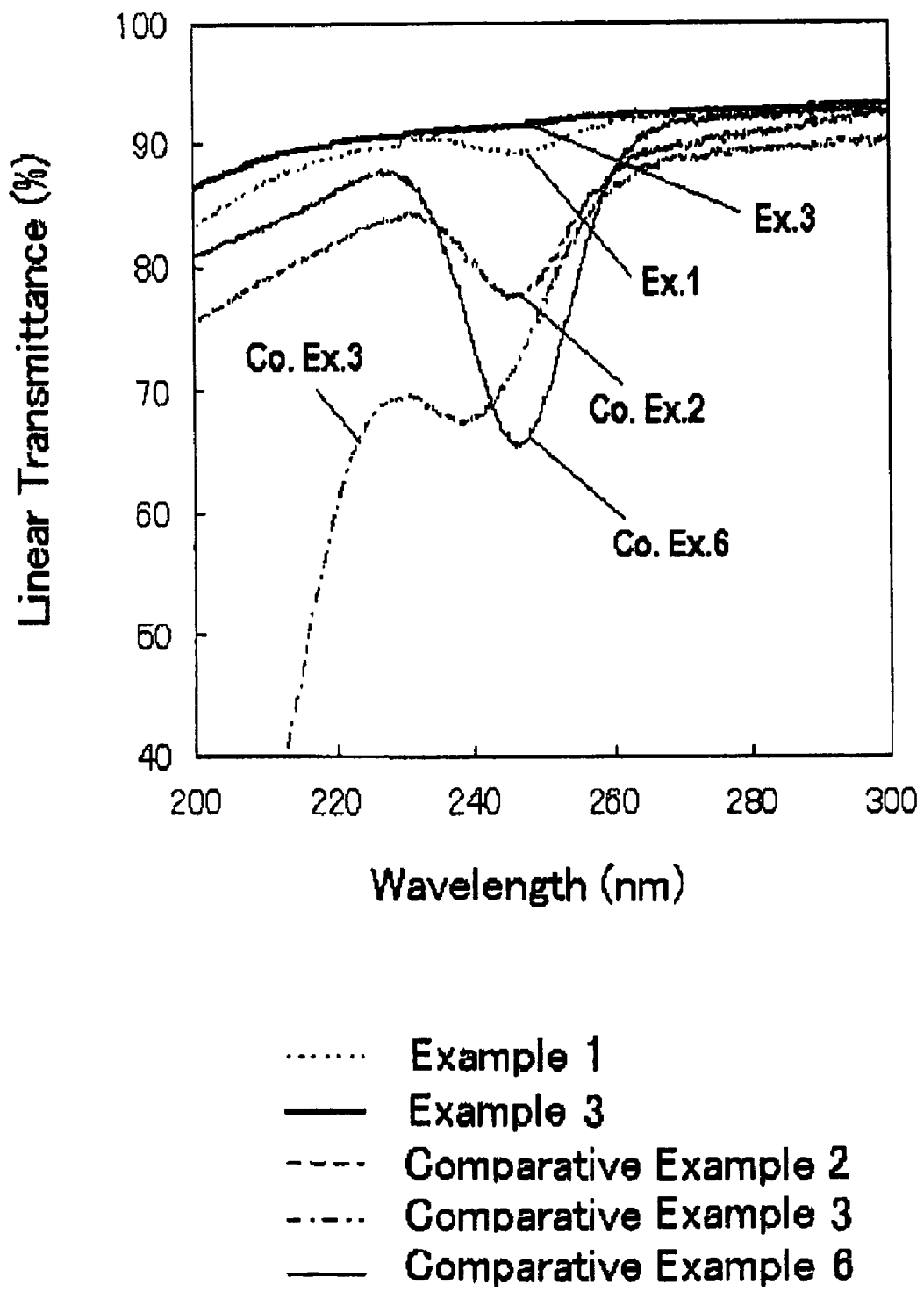
FIG. 1 is graph representation illustrating a relationship of liner transmittance with wavelength in silica glass prepared in examples and comparative examples.

The invention will be described in detail as follows.

The fused silica glass of the present invention has an internal transmittance of ultraviolet ray with a wavelength of 245 nm being at least 95%, preferably at least 98%, as measured at a thickness of 10 mm. By the term "internal transmittance" as used in the present invention, we mean the transmittance as expressed in terms of internal transmission as measured at a thickness of 10 mm under conditions such that the influences of surface reflection, absorption and scattering are excluded. Such a high internal transmittance refers to that the defect of oxygen deficiency is obviated or minimized.

The fused silica glass has a OH group content of not larger than 5 ppm, preferably not larger than 2 ppm. By reducing the OH group content to such a small extent, specific absorption in the infrared ray region is minimized, the reduction of viscosity at a high temperature is avoided, and the diffusion rate of Cu ion is reduced. In view of these benefits, the fused silica glass is suitable, for example, for a jig for heat-treating a semiconductor. The OH group content as used in the present invention refers to the amount of OH group contained in the fused silica glass which is calculated from the intensity of absorption peak at a wavelength of 2730 nm. The detection limit of the OH group content is 1 ppm.

The content of each of Li, Na, K, Mg, Ca and Cu in the fused silica glass of the present invention is smaller than 0.1 ppm, preferably not larger than 0.05 ppm, and more preferably not larger than 0.01 ppm, as expressed in terms of the amount by weight of each metal. By reducing the contents of these metal elements to an extremely low level, the transmittance of ultraviolet ray can be more enhanced, and thus, the fused silica glass is suitable especially for a member of a semiconductor-producing apparatus which is severely required not to be contaminated with impurities. The content of the metal ingredients in the fused silica glass of the present invention is measured by ICP (inductively coupled plasma) emission spectrometry. The detection limit of the content of the metal ingredients is 0.01 ppm.

The fused silica glass of the present invention has a high heat resistance. More specifically it preferably has a viscosity coefficient at 1215° C. of at least $10^{11.5}$ Pa·s, usually in the range of $10^{11.5}$ to $10^{12.0}$ Pa·s.

To enhance the viscosity of the fused silica glass of the invention, aluminum (Al) ingredient can be contained therein. The content of aluminum ingredient is preferably in the range of 0.1 to 3 ppm, more preferably 0.2 to 2 ppm, as expressed in terms of the amount by weight of Al metal. The Al-containing fused silica glass has a high viscosity coefficient at 1215° C. of at least $10^{12.0}$ Pa·s, more specifically in the range of $10^{12.0}$ to $10^{12.5}$ Pa·s.

The fused silica glass of the present invention exhibits a reduced diffusion rate of impurities. More specifically, it has a diffusion coefficient of Cu ion of preferably not larger than $1 \times 10^{-10}$ cm$^2$/sec, more preferably not larger than $3.5 \times 10^{-11}$ cm$^2$/sec, as measured at a depth of greater than 20 µm but not greater than 100 µm, from the surface, when the fused silica glass is left to stand at 1050° C. in the air for 24 hours.

In the fused silica glass having the above-mentioned characteristics according to the present invention, metal impurities such as, for example, Cu and Na do not diffuse deeply from the glass surface in the thickness direction even at a heat-treating step or a stress-removing (annealing) step. When the fused silica glass is used as a furnace tube at a heat-treating step or CVD step in the production course of a semiconductor, undesirable diffusion or permeation of copper and other metal impurities from the outside can be prevented, and therefore, contamination of a wafer placed within the furnace tube can be avoided.

The fused silica glass of the present invention can be produced by a process wherein a powdery silica raw material is cristobalitized in advance, and then, the thus-cristobalitized silica material is fused in a non-reducing atmosphere.

The powdery silica raw material used includes, for example, an amorphous silica powder. Preferable examples of the amorphous silica powder are high-purity amorphous silica powders in which the content of each of Li, Na, K, Mg, Ca and Cu is not larger than 0.05 ppm, more preferably not larger than 0.01 ppm. The fused silica glass made from the high-purity amorphous silica powder has a high purity and is suitable especially for the production of a semiconductor, and further has a high transparency of ultraviolet ray.

The amorphous silica includes, for example, high-purity amorphous silica prepared by a process wherein a silicone alkoxide is hydrolyzed in the presence of hydrogen chloride or ammonia catalyst, and then the thus-prepared silica gel is dried and sintered; and high-purity amorphous silica prepared by a process wherein an aqueous alkali metal silicate solution is reacted with an acid, and then the thus-prepared silica gel is purified and sintered. Of these, high-purity amorphous silica prepared from a silicone alkoxide is preferable because amorphous silica with high purity can be easily obtained.

Various methods can be adopted for cristobalitizing a powdery silica raw material in advance, which include, for example, a method wherein a high-purity amorphous silica powder is sintered at a high temperature for a long time in an appropriate environment which does not cause contamination of the silica powder, to give a high-purity cristobalite powder. In this method, a crystallization accelerator is preferably incorporated in the high-purity amorphous silica powder to be sintered, for improving a throughput in the sintering step and minimizing the contamination with impurities from, for example, a sintering furnace due to the sintering for a long time.

The crystallization accelerator preferably includes, for example, a fine cristobalite or alumina powder. The crystallization accelerator may be used either alone or as a combination of at least two thereof.

The fine cristobalite powder is suitable for the production of a silica glass article for use in a field wherein aluminum is repelled. The amount of fine cristobalite powder is preferably in the range of 0.1 to 10% by weight based on the amorphous silica powder.

The fine alumina powder exhibits an effect of crystallization acceleration and further an effect of enhancing the heat resistance of silica glass, as used in an amount of at least approximately 0.1 ppm as aluminum metal. Aluminum undesirably forms aluminum fluoride particles at a step of dry-cleaning using a fluorine-containing washing solvent in the semiconductor-producing process, therefore, the amount of alumina incorporated in the amorphous silica is preferably minimized. The effect of enhancing the heat resistance of silica glass usually becomes the highest when the amount of Al is approximately 2 to 3 ppm as aluminum metal. Therefore, for the production of a silica glass article for use in a field wherein the fluoride particles are repelled, the alumina powder is incorporated preferably in an amount in the range of 0.1 to 3 ppm, more preferably 0.2 to 2 ppm.

The sintering temperature is preferably from 1200 to 1700° C. The sintering time is preferably from 1 to 100 hours. The sintering is preferably carried out in vacuum or in an atmosphere of nitrogen, argon, helium or oxygen.

In the case when the powdery silica raw material is cristobalitized and sintered, the amount of OH group contained in the powdery silica raw material is reduced, and thus, by conducting the fusion of the sintered product in a reducing atmosphere, the fused silica glass of the present invention can be industrially advantageously obtained.

The extent to which the powdery silica raw material is cristobalitized, namely, the degree of crystallization, is preferably substantially 100%, but may usually be at least 70%. The degree of crystallization can be determined, for example, by the X-ray diffractometry. More specifically the degree of crystallization can be calculated, for example, from the area ratio of the broad halo pattern showing the presence of amorphous silica to the sharp peaks showing the presence of cristobalite.

After cristobalitization of a powdery silica raw material, the cristobalitized silica material is fused. To avoid occurrence of the defect of oxygen deficiency, the fusion is carried out in a non-reducing atmosphere. If the fusion is carried out in a reducing atmosphere, the oxygen deficiency often occurs and an absorption peak is often observed in the vicinity of 245 nm. The non-reducing atmosphere includes, for example, an atmosphere of He, $N_2$, Ar or $O_2$.

The fusion is carried out under conditions such that the amount of OH group, once reduced by cristobalitization, is not increased. Therefore a flame is not used as a heat source. A plasma arc fusion method and an electrical fusion method are preferably adopted. Of these, a plasma arc fusion method is especially preferable because an ingot can be produced without use of a vessel and hence contamination from the vessel can be avoided.

In the case when silica glass articles having no bubbles are produced, a hot isostatic pressing (HIP) treatment can be carried out so that the bubbles within the silica glass articles completely disappear. Birefringence (stress) occasionally occurs in the silica glass due to the HIP treatment, but the stress can be removed by carrying out an annealing treatment at a temperature of approximately 1200° C.

EXAMPLES

The invention will now be described in more detail by the following examples that by no means limit the scope of the invention, Evaluation of silica glass was carried out by the following methods.

<Analysis of Impurities>

A glass sample was dissolved in hydrofluoric acid, and inductively coupled plasma (ICP) emission spectrometry is carried out on the resulting solution to determine the contents of impurities contained in the glass sample.

<245 nm Internal Transmittance>

A test sample was prepared by cutting out a small piece from an ingot and the confronting faces thereof were optically polished to prepare the test sample having a thickness of 10 mm. A linear transmittance (T) including reflection loss at a wavelength of 245 nm was measured. Internal transmittance (Ti) at a thickness of 10 mm was determined according to the following equation (1), Reflectance (R) was set at 4% on all of the test samples.

$$T = \frac{(1-R)^2 T_i}{1 - R^2 T_i^2} \quad \text{Equation (1)}$$

where T: linear transmittance including reflection loss
R: reflectance
Ti: internal transmittance <OH Group Content>

A test sample was prepared by the same procedure as adopted for the preparation of the test sample for 245 nm internal transmittance. Light transmittance was measured at incident light wavelengths of 2.73 μm and 2.63 μm. The amount (C) of OH group contained in the glass sample was calculated from the following equation (2).

$$C = \frac{997}{t} \times \log_{10}\left(\frac{T_{2.63}}{T_{2.73}}\right) \quad \text{Equation (2)}$$

where C: OH group content (ppm)
$T_{2.63}$: transmittance at a wavelength of 2.63 μm
$T_{2.73}$: transmittance at a wavelength of 2.73 μm
t: thickness of test sample (mm)

<Viscosity Coefficient>

A rectangular test specimen with a size of 3 mm×5 mm×110 mm was cut out from a glass ingot. A beam specimen was hold at 1215° C. for 10 hours while one end thereof being supported. Viscosity coefficient was calculated from the amount of deflection according to the following equation (3).

$$\eta = \frac{\rho g \Delta t a^4}{2b^2 h} \quad \text{Equation (3)}$$

where η: viscosity coefficient
ρ: density of glass
g: acceleration of gravity
Δt: holding time
a: overhang length of beam specimen
b: thickness of beam specimen
h: amount of deflection <Diffusion of Cu Ion>

A rectangular test specimen with a size of 50 mm×50 mm ×1 mm was cut out from a glass ingot. The specimen was placed in a case with a lid, made of high-purity silica glass. 0.4 g of a CuO powder was put in the case in a manner such that the CuO powder is not in direct contact with the test specimen. The case was lidded and placed in an electric furnace with a furnace tube made of silica glass. The furnace tube was heated from room temperature to 1050° C. at an elevation rate of 300° C./hour in the air, and maintained at 1050° C. for 24 hours. After completion of heating, the test specimen was gradually dissolved from the surface toward the core in a mixed solution of hydrofluoric acid with nitric acid. The copper ion concentration in the solution was measured by atomic absorption spectrometry during the course of dissolution to determine the distribution of the copper concentration in the thickness direction of the test specimen, i.e., the variation of the copper ion concentration depending upon the depth from the surface of the test specimen was determined.

The diffusion coefficient of copper ion was calculated from the following equation (4), which is applied usually to the diffusion in the interior of a semi-infinite solid. The copper ion concentration was measured at a depth in the range of exceeding 20 μm to 100 μm from the surface of the test specimen. However, the measurement was not carried out for the surface portion at a depth in the range from the surface to 20 μm, because an experimental error in this depth range is large. The measurement was carried out at five points or more, and the diffusion coefficient was calculated from the equation (4) using the method of least squares.

$$C = C_0\left(1 - \text{erf}\left(\frac{x}{2\sqrt{Dt}}\right)\right) \quad \text{Equation (4)}$$

where C: concentration [ppm] at a depth (distance) χ from the surface
$C_0$: initial concentration
χ: depth (distance) [cm] from the surface
D: Diffusion coefficient [cm²/sec]
t: diffusion time [sec]
erf(z), error function, and $$\text{erf}\left(\frac{x}{2\sqrt{Dt}}\right)$$

is a characteristic defined by $$\frac{2}{\sqrt{\pi}} \int_0^{\frac{x}{2\sqrt{Dt}}} e^{-y^2} dy$$

Example 1

A high-purity amorphous synthetic silica powder having a particle diameter of approximately 200μm, a OH group content of 40 ppm, and a metal impurity content such that each of Li, Na, K, Mg, Ca and Cu was not larger than 0.01 ppm, was mixed with 0.1% by weight of a cristobalite powder. The mixed powder was sintered at 1500° C. for 60 hours to give a cristobalite powder having a crystallization degree of approximately 100%.

The thus-obtained cristobalite powder was fused by a plasma arc at an input power of 590 A/160 V and a raw material feed rate of 4.5 kg/hr in an argon atmosphere to give a glass ingot. The glass ingot was subjected to a HIP treatment, and then an annealing treatment to remove stress.

The thus-obtained fused silica glass had a metal impurity content and a OH group content, as shown in Table 1, below. The fused silica glass had an internal transmittance of ultraviolet ray with a wavelength of 245 nm, and a viscosity coefficient at 1215° C., as shown in Table 2. Thus, the fused silica glass of Example 1 did not exhibit a specific absorption in the region spanning from ultraviolet ray to infrared ray, and had a high purity and a high viscosity.

Figure 2:
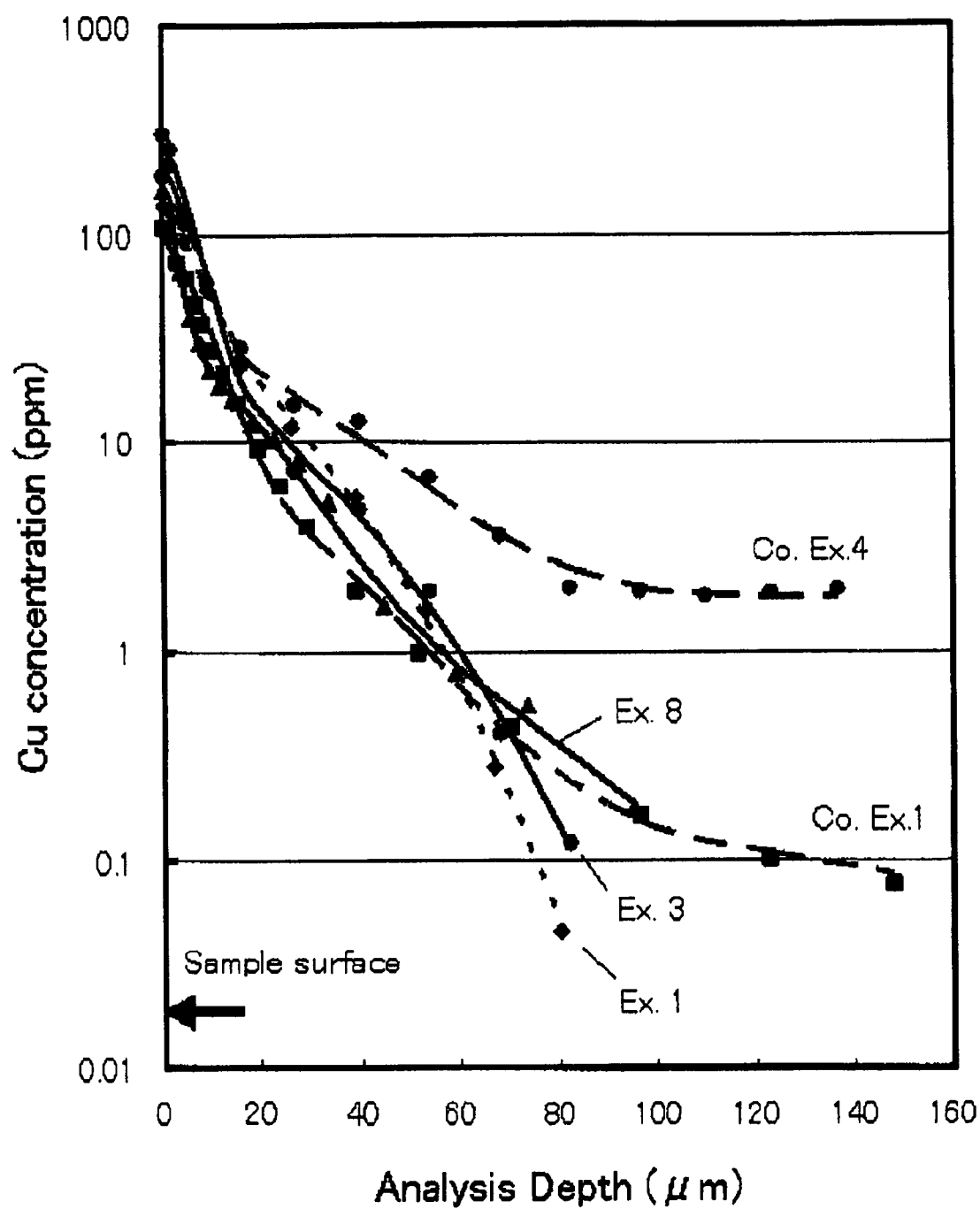
FIG. 2 is graph representation illustrating a profile of Cu ion concentration varying depending upon the depth of silica glass prepared in Examples 1, 3 and 3 and Comparative Examples 1 and 4.

The distribution of the copper ion concentration as measured when the heat-treatment was conducted at 1050° C. for 24 hours in the air using CuO as diffusion source is shown in FIG. 2. The diffusion coefficient, calculated from the equation (4) on the basis of the data for the Cu ion concentration as measured at a depth exceeding 20 μm but not larger than 100 μm from the surface, was $3.44 \times 10^{-11}$ cm$^2$/sec.

TABLE 1

|  | Results of ICP Analysis [ppb] | | | | | | | OH content [ppm] |
| --- | --- | --- | --- | --- | --- | --- | --- | --- |
|  | Al | Li | Na | K | Mg | Ca | Cu |  |
| Ex. 1 | <10 | <10 | <10 | <10 | <10 | 21 | <10 | <1 |
| Ex. 2 | <10 | <10 | 17 | <10 | <10 | 32 | <10 | <1 |
| Ex. 3 | 1100 | <10 | <10 | 18 | 11 | 12 | <10 | 2 |
| Ex. 4 | 890 | <10 | 15 | <10 | <10 | 46 | <10 | <1 |
| Co. Ex. 1 | <10 | <10 | <10 | <10 | 29 | <10 | 17 | 34 |
| Co. Ex. 2 | <10 | <10 | 13 | <10 | <10 | 28 | <10 | <1 |
| Co. Ex. 3 | 4600 | 160 | 69 | 110 | 25 | 440 | <10 | 260 |
| Co. Ex. 4 | 6000 | 140 | 290 | 32 | 53 | 650 | <10 | 3 |
| Co. Ex. 5 | 810 | <10 | 59 | 32 | 36 | 220 | <10 | <1 |
| Co. Ex. 6 | <10 | <10 | <10 | <10 | <10 | <10 | <10 | <1 |

TABLE 2

|  | Internal transmittance at 245 nm[%] | log η [Pa · s] |
| --- | --- | --- |
| Ex. 1 | 97 | 11.8 |
| Ex. 2 | 97 | 11.8 |
| Ex. 3 | 99 | 12.1 |
| Ex. 4 | 97 | 12.2 |
| Co. Ex. 1 | 99 | 11.4 |
| Co. Ex. 2 | 84 | 11.8 |
| Co. Ex. 3 | 77 | 11.6 |
| Co. Ex. 4 | 79 | 12.1 |
| Co. Ex. 5 | 82 | 12.1 |
| Co. Ex. 6 | 72 | 11.9 |

Example 2

Substantially the same procedures as adopted in Example 1, fused silica glass was made wherein an electric fusion method was adopted instead of the plasma arc fusion method for fusing the sintered crystbalitized powder, and the fusion was conducted at 1800° C. for 1 hour in N$_2$ atmosphere. All other conditions and procedures remained the same.

The impurity contents, internal transmittance and viscosity coefficient of the fused silica glass are shown in Tables 1 and 2. Thus the fused silica glass of Example 2 did not exhibit a specific absorption in the region spanning from ultraviolet ray to infrared ray, and had a high purity and a high viscosity.

Example 3

Substantially the same procedures as adopted in Example 1, fused silica glass was made, wherein the same high-purity amorphous synthetic silica powder as used in Example 1 was mixed with an alumina powder in an amount of 1 ppm as Al metal, and the mixed powder was sintered under the same conditions as in Example 1 to give a cristobalite powder with a crystallization degree of approximately 100%, and the fused silica glass was made therefrom. All other conditions and procedures remained the same.

The impurity contents, internal transmittance and viscosity coefficient of the fused silica glass are shown in Tables 1 and 2. Thus the fused silica glass of Example 3 did not exhibit a specific absorption in the region spanning from ultraviolet ray to infrared ray, and had a high purity and a high viscosity.

The distribution of the copper ion concentration as measured when the heat-treatment was conducted at 1050° C. for 24 hours in the air using CuO as diffusion source is shown in FIG. 2. The diffusion coefficient, calculated from the equation (4) on the basis of the data for the Cu ion concentration as measured at a depth exceeding 20 μm but not larger than 100 μm from the surface, was $4.92 \times 10^{-11}$ cm$^2$/sec.

Figure 3:
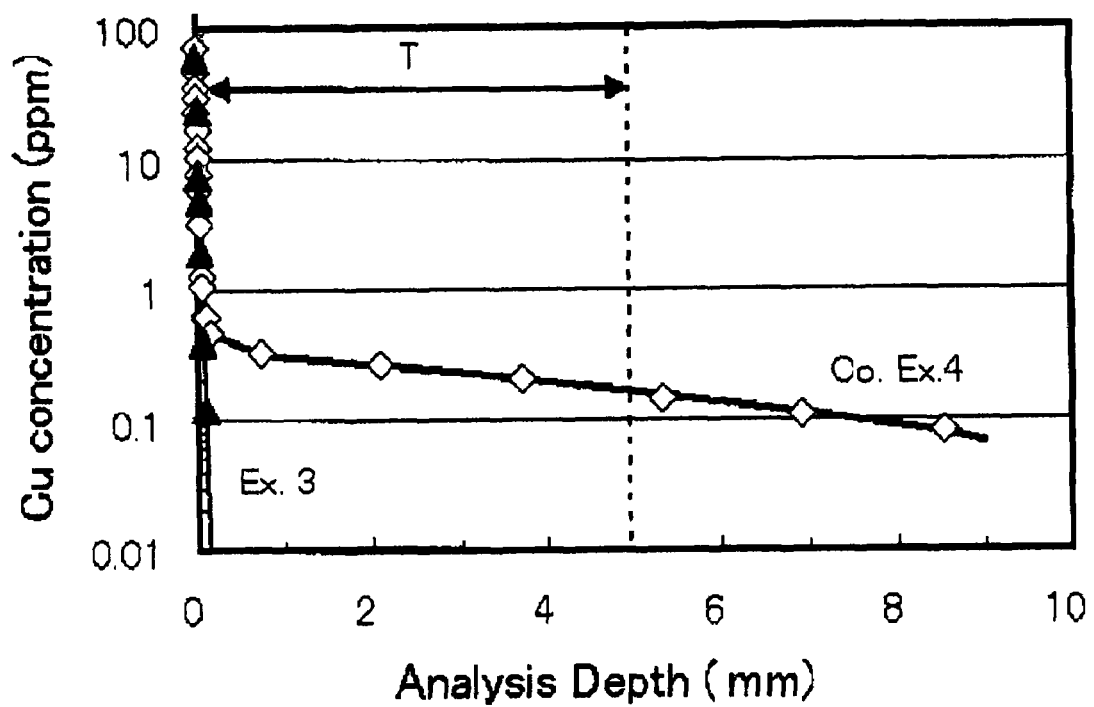
FIG. 3 is graph representation illustrating a profile of Cu ion concentration as measured at a greater depth of silica glass prepared in Example 3 and Comparative Example 4.

The distribution of the copper ion concentration as measured at a larger depth is shown in FIG. 3. As seen from FIG. 3, the diffusion of copper ion in the fused silica glass in Example 3 is observed only in a very limited surface portion,

Example 4

Substantially the same procedures as adopted in Example 3, fused silica glass was made wherein the fusion of the sintered cristobalite powder using a plasma arc was carried out at a raw material feed rate of 4.0 kg/hr with all other conditions and procedures remained the same.

The impurity contents, internal transmittance and viscosity coefficient of the fused silica glass are shown in Tables 1 and 2. Thus the fused silica glass of Example 4 did not exhibit a specific absorption in the region spanning from ultraviolet ray to infrared ray, and had a high purity and a high viscosity.

Comparative Example 1

Substantially the same procedures as adopted in Example 1, fused silica glass was made, wherein the same high-purity amorphous synthetic silica powder as used in Example 1 was fused as it was without cristobalitization to give a glass ingot. All other conditions and procedures remained the same.

The impurity contents, internal transmittance and viscosity coefficient of the fused silica glass are shown in Tables 1 and 2. Thus the fused silica glass of Comparative Example 1 exhibited a high internal transmittance at a wavelength of 245 nm, but, it contained a large amount of OH group, therefore, the viscosity was low.

The distribution of the copper ion concentration as measured when the heat-treatment was conducted at 1050° C. for 24 hours in the air using CuO as diffusion source is shown in FIG. 2. The diffusion coefficient, calculated from the equation (4) on the basis of the data for the Cu ion concentration as measured at a depth exceeding 20 μm but not larger than 100 μm from the surface, was $1.07 \times 10^{-10}$ cm$^2$/sec.

Comparative Example 2

Substantially the same procedures as adopted in Example 1, fused silica glass was made wherein an electric fusion method was adopted instead of the plasma arc fusion method. All other conditions and procedures remained the same.

The impurity contents, internal transmittance and viscosity coefficient of the fused silica glass are shown in Tables 1 and 2. Thus the fused silica glass of Comparative Example 2 contained a small amount of residual OH group and had a high viscosity, but, a specific absorption was observed which was presumed to be due to the defect of oxygen deficiency, and the internal transmittance at a wavelength of 245 nm was low.

Comparative Example 3

Fused silica glass was made by fusing a natural silica powder by an oxyhydrogen flame.

The impurity contents, internal transmittance and viscosity coefficient of the fused silica glass are shown in Tables 1 and 2. Thus the fused silica glass of Comparative Example 3 contained a large amount of Li, Na, K, Mg and Ca and a low internal transmittance at a wavelength of 245 nm.

Comparative Example 4

Fused silica glass was made by fusing a natural silica powder by a plasma arc.

The impurity contents, internal transmittance and viscosity coefficient of the fused silica glass are shown in Tables 1 and 2. Thus the fused silica glass of Comparative Example 4 contained a small amount of residual OH group and had a high viscosity, but, the contents of Li, Na, K, Mg and Ca are large and the internal transmittance at a wavelength of 245 nm was low.

The distribution of the copper ion concentration as measured when the heat-treatment was conducted at 1050° C. for 24 hours in the air using CuO as diffusion source is shown in FIG. 2. The diffusion coefficient, calculated from the equation (4) on the basis of the data for the Cu ion concentration as measured at a depth exceeding 20 μm but not larger than 100 μm from the surface, was $1.53 \times 10^{-10}$ cm$^2$/sec.

The distribution of the copper ion concentration as measured at a larger depth is shown in FIG. 3. As seen from FIG. 3, the diffusion of copper ion in the fused silica glass in Example 4 is observed at a larger depth. This shows that the copper ion is diffused through the entire glass wall thickness (usually approximately 5 mm) of a furnace tube conventionally used for heat-treating a semiconductor.

Comparative Example 5

Substantially the same procedures as adopted in Example 3, fused silica glass was made wherein an amorphous synthetic silica powder containing not larger than 0.01 ppm of Li, 0.12 ppm of Na, 0.05 ppm of K, 0.05 ppm of Mg, 0.22 ppm of Ca and not larger than 0.01 ppm of Cu was used instead of the natural silica powder. All other conditions and procedures remained the same.

The impurity contents, internal transmittance and viscosity coefficient of the fused silica glass are shown in Tables 1 and 2. Thus the fused silica glass of Comparative Example 5 contained a small amount of residual OH group and had a high viscosity, but, the contents of Li, Na, K, Mg and Ca were large and the internal transmittance at a wavelength of 245 nm was low.

Comparative Example 6

A porous silica glass (soot) was made by thermal hydrolysis of silicon tetrachloride using a oxyhydrogen flame. The porous silica glass was heat-treated in a reducing atmosphere and then sintered.

The impurity contents, internal transmittance and viscosity coefficient of the thus-obtained silica glass are shown in Tables 1 and 2. Thus the silica glass of Comparative Example 6 contained a small amount of residual OH group and had a high viscosity, but, the internal transmittance at a wavelength of 245 nm was low. Therefore it is presumed that the defect of the oxygen deficiency occurred. Further the production process was complicated and thus the production cost was very high.

Examples 5 to 8

Substantially the same procedures as adopted in Example 1, fused silica glass was made, wherein the amount of an alumina powder incorporated in the high-purity amorphous synthetic silica powder was varied as shown in Table 3 with all other conditions and procedures remaining the same.

The content of residual OH group and viscosity coefficient of the fused silica glass are shown in Table 3. For comparison, these properties of the fused silica glass of Example 1, which was made without incorporation of alumina, are also shown in Table 3. It is seen that the viscosity of silica glass is enhanced by the incorporation of alumina, and reaches the maximum value at an Al content of approximately 2 ppm.

The distribution of the copper ion concentration as measured when the heat-treatment was conducted at 1050° C. for 24 hours in the air using CuO as diffusion source is shown in FIG. 2. The diffusion coefficient, calculated from the equation (4) on the basis of the data for the Cu ion concentration as measured at a depth exceeding 20 μm but not larger than 100 μm from the surface, was $1.50 \times 10^{-10}$ cm$^2$/sec.

TABLE 3

|  | Al content [ppm] | OH content [ppm] | log η at 1215° C. [Pa · s] |
|---|---|---|---|
| Ex. 1 | <0.01 | <1 | 11.8 |
| Ex. 5 | 0.18 | 1 | 12.0 |
| Ex. 6 | 0.90 | 1 | 12.1 |
| Ex. 7 | 1.9 | <1 | 12.2 |
| Ex. 8 | 3.6 | <1 | 12.2 |

INDUSTRIAL APPLICABILITY

The fused silica glass of the present invention does not exhibit or exhibits only to a minimized extent a specific absorption in the wavelength region spanning from ultraviolet ray, through visible ray to infrared ray. Therefore, the fused silica glass is suitable for various optical goods for which a high transparency is required, especially useful for viewports, for example, for detecting the end point of etching. Further, the fused silica glass of the present invention has a high purity and a good high-temperature viscosity and exhibiting a reduced diffusion rate of copper ion and other metal impurities. Therefore, the fused silica glass is suitable for a member of a semiconductor-production apparatus, such as furnace material or and jig, which are used for heat-treating or producing a semiconductor; a jig for a MEMS production apparatus; a lens and a lamp for ultraviolet ray; and a glass substrate for liquid crystal display.

The invention claimed is:

1. Fused silica glass characterized by having an internal transmittance of ultraviolet ray with a wavelength of 245 nm being at least 95% as measured at a thickness of 10 mm, a OH group content of not larger than 5 ppm, and a content of each of Li, Na, K, Mg, Ca and Cu being smaller than 0.1 ppm, and containing 0.1 ppm by weight to 3 ppm by weight of aluminum ingredient as aluminum metal, and having a viscosity coefficient at 1215° C. of at least $10^{11.5}$ Pa·s.

2. Fused silica glass according to claim 1, further having an internal transmittance of ultraviolet ray with a wavelength of 245 nm being at least 98% as measured at a thickness of 10 nm.

3. Fused silica glass according to claim 1, having a viscosity coefficient at 1215° C. of at least $10^{12.0}$ Pa·s.

4. Fused silica glass according to claim 1, further having a diffusion coefficient of Cu ion of not larger than $1\times10^{-10}$ $cm^2$/sec as measured at a depth of greater than 20 µm but not greater than 100 µm, from the surface, when the fused silica glass is left to stand at 1050° C. in the air for 24 hours.

5. A process for producing the fused silica glass as claimed in claim 1, comprising:
   cristobalitizing a powdery silica raw material; and then,
   fusing the thus-cristobalitized silica material in a non-reducing atmosphere.

6. The process for producing the fused silica glass according to claim 5, wherein the fusion of the cristobalitized silica material is carried out by a plasma arc fusion method.

7. A semiconductor-producing apparatus, characterized by being provided with a member comprised of the fused silica glass as claimed in claim 1.

8. A liquid crystal-producing apparatus, characterized by being provided with a member comprised of the fused silica glass as claimed in claim 1.

* * * * *